(12) United States Patent
Blandina et al.

(10) Patent No.: US 8,635,114 B2
(45) Date of Patent: *Jan. 21, 2014

(54) STORED VALUE TRANSACTION SYSTEM AND METHOD INCLUDING AN INTEGRATED DATABASE SERVER

(75) Inventors: Michael Blandina, Aurora, CO (US);
Robert Berry, Salt Lake City, UT (US);
Mari Belczynski, Aurora, CO (US)

(73) Assignee: Lead Core Fund, L.L.C., Dover, DE (US)

( * ) Notice: Subject to any disclaimer, the term of this patent is extended or adjusted under 35 U.S.C. 154(b) by 193 days.

This patent is subject to a terminal disclaimer.

(21) Appl. No.: 12/902,820

(22) Filed: Oct. 12, 2010
(Under 37 CFR 1.47)

(65) Prior Publication Data
US 2011/0029395 A1    Feb. 3, 2011

Related U.S. Application Data

(63) Continuation of application No. 12/240,714, filed on Sep. 29, 2008, now Pat. No. 7,840,446, which is a continuation of application No. 11/669,008, filed on Jan. 30, 2007, now Pat. No. 7,447,648, which is a continuation of application No. 09/241,188, filed on Feb. 1, 1999, now Pat. No. 7,216,091, which is a continuation of application No. 09/105,406, filed on Jun. 26, 1998, now abandoned.

(51) Int. Cl.
*G06Q 30/00* (2012.01)

(52) U.S. Cl.
USPC ......................................... 705/26.1; 705/27.1

(58) Field of Classification Search
USPC ............................................... 705/26.1, 27.1
See application file for complete search history.

(56) References Cited

U.S. PATENT DOCUMENTS

| 3,970,992 A | 7/1976 | Boothroyd et al. |
| 4,851,650 A | 7/1989 | Kitade |

(Continued)

FOREIGN PATENT DOCUMENTS

| EP | 0 667 586 | 8/1995 |
| WO | 9710560 | 3/1997 |

(Continued)

OTHER PUBLICATIONS

Warner, Fara, Credit-Card Issuers Aim for the Masses—Firms Rethink Asian Strategies to Reach the Young and the New Middle Class, Asian Wall Street Journal [Victoria, Hong Kong] Nov. 8, 1995: 1, downloaded from ProQuestDirect on the Internet on Jan. 27, 2013, 3 pages.*

(Continued)

*Primary Examiner* — James Zurita

(57) ABSTRACT

An integrated database and information server are provided that efficiently share information and tasks between various stored value programs. A server is configured to provide reusable objects and data structures that are suitably shared between various stored value products. A database at the server allows data to be shared between various programs so that each consumer associates with only one database record even though that consumer may use multiple shared value products. By integrating modules and avoiding duplicate records, the record communicates with all stored value programs, so the information does not need to be repeatedly entered into the database. Moreover, new stored value products are quickly and easily created through selection and arrangement of various shared objects preferably maintained within the database.

20 Claims, 11 Drawing Sheets

(56) References Cited

U.S. PATENT DOCUMENTS

| | | | |
|---|---|---|---|
| 4,882,473 A | | 11/1989 | Bergeron et al. |
| 5,036,461 A | | 7/1991 | Elliott et al. |
| 5,335,169 A | | 8/1994 | Chong |
| 5,420,405 A | | 5/1995 | Chasek |
| 5,459,304 A | | 10/1995 | Eisenmann |
| 5,521,363 A | | 5/1996 | Tannenbaum |
| 5,544,246 A | | 8/1996 | Mandelbaum et al. |
| 5,566,327 A | | 10/1996 | Sehr |
| 5,574,269 A | | 11/1996 | Mori et al. |
| 5,577,109 A | | 11/1996 | Stimson et al. |
| 5,638,519 A | | 6/1997 | Haluska |
| 5,696,909 A | | 12/1997 | Wallner |
| 5,878,143 A | | 3/1999 | Moore |
| 5,936,221 A | | 8/1999 | Corder et al. |
| 5,967,896 A | | 10/1999 | Jorasch et al. |
| 5,969,318 A | | 10/1999 | Mackenthun |
| 6,000,608 A | | 12/1999 | Dorf |
| 6,016,484 A | * | 1/2000 | Williams et al. ............... 705/39 |
| 6,024,286 A | | 2/2000 | Bradley et al. |
| 6,047,267 A | | 4/2000 | Owens et al. |
| 6,078,891 A | | 6/2000 | Riordan et al. |
| 6,144,948 A | * | 11/2000 | Walker et al. ............... 705/38 |
| 6,226,623 B1 | | 5/2001 | Schein et al. |

FOREIGN PATENT DOCUMENTS

| | | |
|---|---|---|
| WO | 9808175 | 2/1998 |
| WO | 9905633 | 2/1999 |

OTHER PUBLICATIONS

CA; Office Action dated Feb. 6, 2004 in Canadian Patent Application No. 2,335,881.
CA; Office Action dated Mar. 14, 2005 in Canadian Patent Application No. 2,335,881.
CA; Office Action dated Oct. 17, 2008 in Canadian Patent Application No. 2,335,881.
MX; Office Action dated Jun. 9, 2006 in Mexican Application No. PA/a/2000/012779.
GB; Examination Report dated Aug. 7, 2002 in Application No. GB 0031532.5.
PCT; International Search Report dated Jun. 10, 1999 in Application No. PCT/US99/12118.
PCT; Written Opinion dated May 5, 2000 in Application No. PCT/US99/12118.
PCT; International Preliminary Examination Report dated Aug. 30, 2000 in Application No. PCT/US99/12118.
Deborah Radcliff, "Universal servers: Does on size fit all?" Software Magazine, Englewood: May 1997, vol. 17, Iss. 5, p. 36.
Notice of Allowance in U.S. Appl. No. 11/669,008, issued Jun. 27, 2008, 8 pages.
Notice of Allowance in U.S. Appl. No. 09/241,188, issued Jan. 19, 2007, 8 pages.
Office Action in U.S. Appl. No. 09/105,406 issued Apr. 27, 2000, 13 pages.
Office Action in U.S. Appl. No. 09/105,406, issued Oct. 27, 1999, 8 pages.

* cited by examiner

STORED VALUE TRANSACTION SYSTEM AND METHOD INCLUDING AN INTEGRATED DATABASE SERVER

CROSS-REFERENCE TO RELATED APPLICATIONS

This application is a continuation of, and claims priority to, U.S. patent application Ser. No. 12/240,714 filed Sep. 29, 2008 and entitled "STORED VALUE TRANSACTION SYSTEM AND METHOD INCLUDING AN INTEGRATED DATABASE SERVER." The '714 application is a continuation of, and claims priority to, U.S. Pat. No. 7,447,648 issued on Nov. 4, 2008 and entitled "STORED VALUE TRANSACTION SYSTEM INCLUDING AN INTEGRATED DATABASE SERVER" (aka U.S. patent application Ser. No. 11/669,008 filed Jan. 30, 2007). The '648 patent is a continuation of, and claims priority to, U.S. Pat. No. 7,216,091 issued on May 8, 2007 and entitled "STORED VALUE TRANSACTION SYSTEM INCLUDING AN INTEGRATED DATABASE SERVER" (aka U.S. patent application Ser. No. 09/241,188 filed Feb. 1, 1999). The '091 patent is a continuation of U.S. patent application Ser. No. 09/105,406 filed on Jun. 26, 1998 and entitled "STORED VALUE TRANSACTION SYSTEM INCLUDING AN INTEGRATED DATABASE SERVER" which is abandoned. All of these applications are incorporated herein by reference.

FIELD OF INVENTION

The present invention relates generally to financial transaction systems, and more particularly, to a computer server and architecture for managing financial transactions involving stored value products.

BACKGROUND OF THE INVENTION

Financial systems using stored value products are well-known in the art. An example of a stored value product is a pre-paid telephone card, which is typically a plastic or paper card with a unique identification code. The code may be printed on the front of the card, or it may be stored electronically on a magnetic stripe that is attached to the card. To access the value on the card, consumers may, for example, dial a pre-determined phone number and input the unique code, thereby identifying the card and allowing the consumer to access a service (such as long distance telephone service). Besides telephone services, magnetic stripe cards have been used to pre-pay for, among other things, gasoline or department store merchandise. In these industries, special card reading machines such as those found in many retail establishments (e.g. point of sale (POS) terminals) are typically configured to read the magnetic stripes incorporated onto the card.

A relatively new stored value technology is the smartcard which typically replaces the magnetic stripe with a microprocessor. Other stored value products include, for example, ATM cards, at-home banking and many Internet commerce products.

Stored value products have been suggested as a replacement for cash in many transactions because such products have been shown to be secure and convenient without compromising the privacy of the user. Consumers frequently purchase stored value cards for pre-determined amounts, or, alternatively, the card may be configured to hold an electronic representation of value that the consumer has purchased.

However, unlike cash transactions, stored value transactions typically utilize an administrator to facilitate card creation, card distribution, transaction management, and/or the like. Administering institutions frequently support multiple stored value products through computer systems that are configured to track information such as card balances, consumer mailing addresses, financial transactions and/or the like. The interfaces and components associated with each stored value product (smartcard, phone card, ATM card, etc) often require that each product be administered by a dedicated computer system. Accordingly, when administering institutions support multiple stored value products, they often support multiple computer systems. As shown in FIGS. 1A and 1B, these computer systems are frequently disjoint systems configured to support only one particular stored value product. These disjoint systems are usually inefficient because they often incorporate substantial duplication in data and administrative overhead. For example, functions that are commonly implemented on each administration system include, among others: adding new cards, enrolling customers in new accounts, issuing personal identification numbers (PINs), adding value to smartcards and other accounts, handling transactions (merchant, ATM, telephone, etc.), and generating reports (such as billing statements and letters to consumers). An example of such a prior art pre-paid card system is disclosed in U.S. Pat. No. 5,577,109 issued on Nov. 19, 1996 to Stimson et al., which is incorporated herein by reference. Similarly, a system for supporting multiple functionality on a single card is disclosed in U.S. Pat. No. 5,574,269 issued on Nov. 12, 1996 to Mori et al., which is incorporated herein by reference.

Recently, as shown in FIG. 1B, some disjoint administrative systems have become somewhat more integrated through the sharing of limited functionality such as card authorization and transaction processing. Although this arrangement is improved over that of FIG. 1A in that it is somewhat less redundant, the FIG. 1B arrangement still includes substantial duplication of information and administration because each program incorporates data records and general parameters such as currency type, language used, etc. Disjoint systems exhibit a further disadvantage in that each administration system is typically individually constructed, thus requiring excessive time, labor and expense to create, maintain and operate.

Accordingly, there exists a need for a card management system that will simultaneously support various stored value products and their associated functions. Such a system is needed to reduce implementation times, to improve data processing efficiency and to reduce administrative overhead for each system.

SUMMARY OF THE INVENTION

An integrated database and information server are provided that efficiently share information and tasks between various stored value products. A server is configured to provide reusable objects and data structures that are common to multiple stored value products. A database at the server allows data to be shared between various shared value products so that each consumer associates with only one database record even though that consumer may use multiple stored value products. An exemplary common record for a consumer includes information relating to mailing addresses, preferred language, and the like. By integrating modules and avoiding duplicate records, the record communicates with all stored value products, so the information does not need to be repeatedly entered into the database. Moreover, new stored value products are quickly and easily created through selection and arrangement of various reusable, shared objects stored in the database.

BRIEF DESCRIPTION OF THE DRAWINGS

The above and other objects, features and advantages of the present invention are hereinafter described in the following detailed description of illustrative embodiments to be read in conjunction with the accompanying drawing figures, wherein like reference numerals are used to identify the same or similar parts in the similar views, and.

DETAILED DESCRIPTION

Figure 1A:
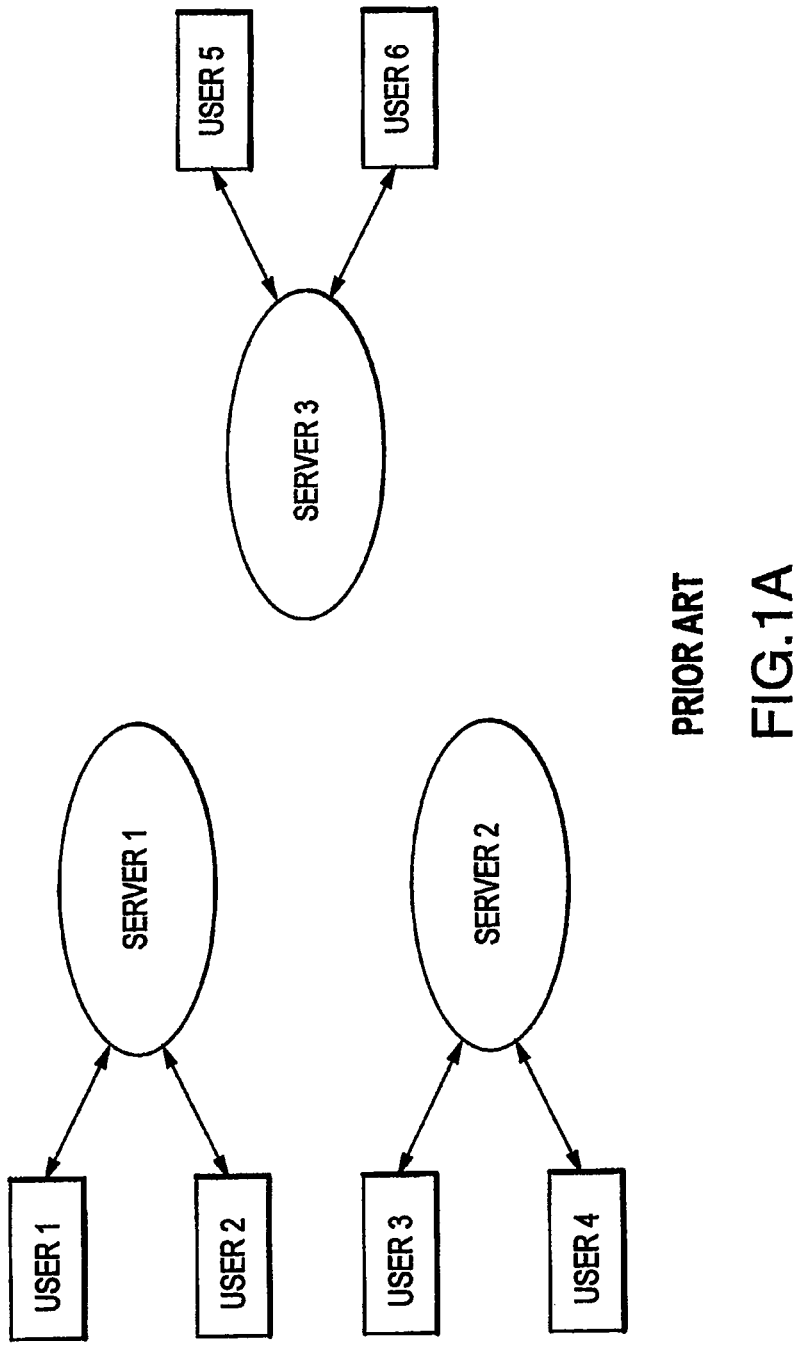
FIG. 1A is an exemplary entity relationship diagram of prior art administration servers for stored value products.
Figure 1B:
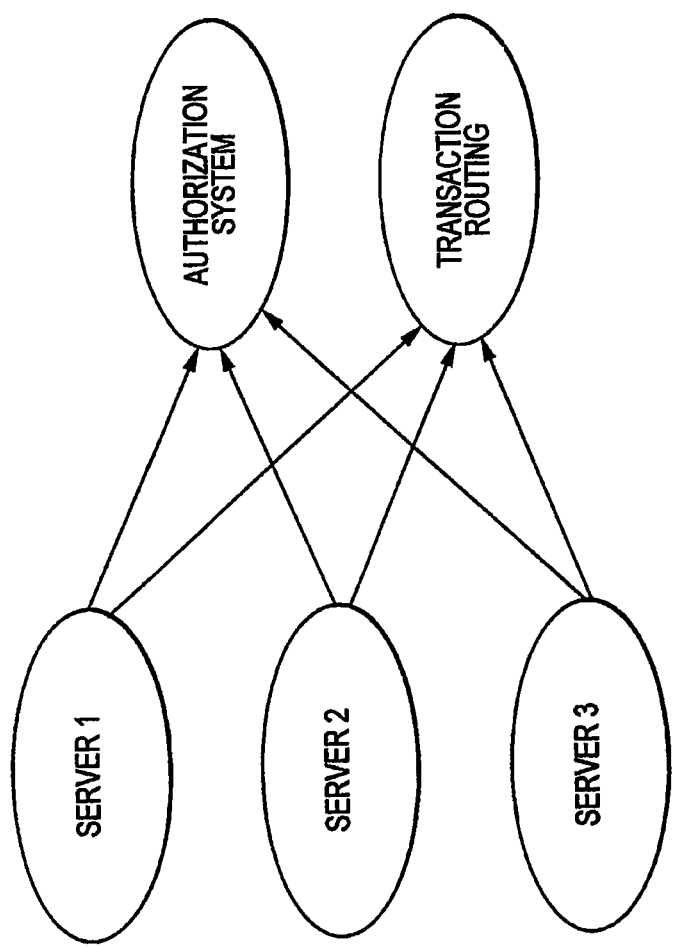
FIG. 1B is an exemplary entity relationship diagram of prior art administration servers for stored value products with limited functionality sharing.
Figure 2A:
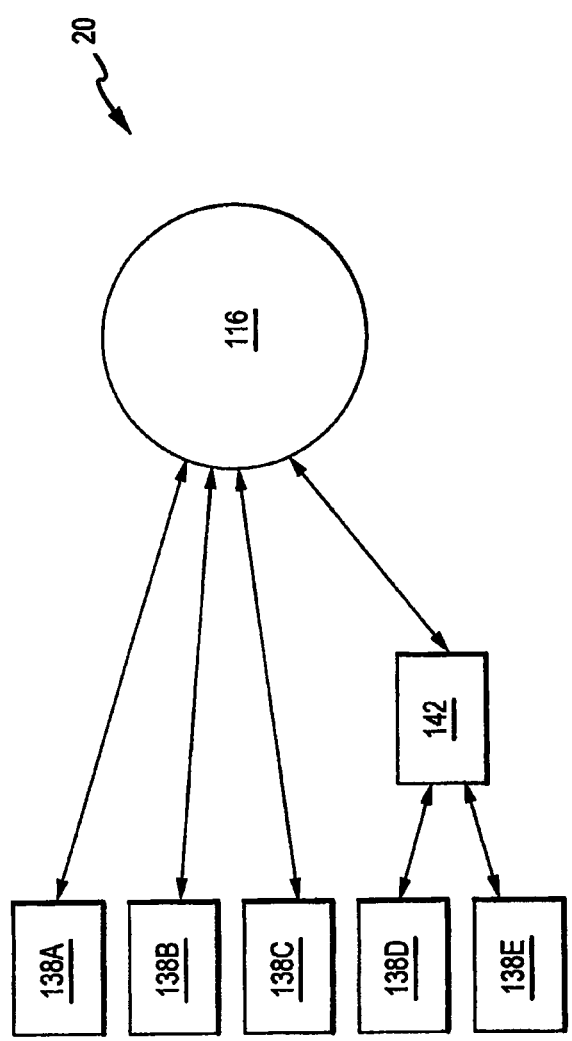
FIG. 2A is an entity relationship diagram of a first exemplary embodiment of the present invention.

Referring to FIG. 2A, a preferred embodiment of the invention suitably includes a system 20 which includes a database server 116 that suitably supports a number of stored value products such as, for example, various brands of smartcards, magnetic stripe cards, ATM cards, Internet transaction accounts, or other stored value products. Stored value products often correspond to financial products offered to customers by financial institutions. Financial products may include checking accounts, savings accounts, credit cards, customer loyalty accounts, or any other type of financial instrument which would be suitably associated with a stored value product. Database server 116 generally provides centralized management of the various products, and preferably includes a database (such as a relational or object oriented database) that centralizes data and procedures to be shared across the various stored value products.

As shown in FIG. 2A, client system 138 is any device or entity that is suitably configured to include particular functionalities and to interface with a common server. Client systems 138 preferably include only the functionality that is unique to the particular client system 138, such as, for example, sales and pricing information and interface handling. In other words, most common functionality is located and shared at database server 116 such as, for example, card/account creation, addition of funds, account information, report information and/or the like (the details of the functionality are described below with respect to FIG. 8). In a particu-larly preferred embodiment, client system 138 represents a particular brand of a smart card. Client systems 138 suitably transmit data to database server 116 corresponding to the creation of new stored value cards/accounts and to the addition of funds in the stored value account. In alternative embodiments of the invention, client systems 138 suitably receive data such as account information and report information from database server 116. Alternatively, as can be seen from FIG. 2B, database server 116 interacts with client systems 138 through intermediating modules such as report generating system 136 and card production system 128. In other embodiments, client system 138 resides on database server 116, operating as a separate process. In still other embodiments, client systems 138 are eliminated entirely and consumers and business entities interact directly with database server 116.

Database server 116 preferably supports two modes of interacting with client systems 138. The first mode of system 20 (shown by client systems 138A, 138B and 138C in FIG. 2A) is typically referred to as a "centralized back end" or "centralized back office" because the client system 138 merely acts as a "front end" (i.e. interface) for database server 116 which primarily handles data management functions. In embodiments wherein client system 138 is a business entity, representatives of the client business entity provide information to database server 116 electronically, through online CSR input, or other means.

The second mode of system 20 (commonly called the "decentralized back end" or "decentralized back office") suitably incorporates a franchise server 120 between client systems 138D-E and database server 116. Franchise server 120 suitably interfaces with stored value products from several different organizations while retaining centralized data management in database server 116. In a particularly preferred embodiment, franchise server 120 supports a business entity having several customers corresponding to client systems 138. As can be seen from FIG. 2A, a single database server 116 is preferably configured to simultaneously supporting multiple centralized and decentralized back office client systems 138. Alternatively, multiple database servers 116 are configured to interface with any combination of centralized or decentralized franchise servers 120.

The various servers and clients discussed above are suitably connected through any electronic communication media including, for example, telephone links, leased lines, frame relay or asynchronous transfer mode connections, local area networks, or wide area networks. Alternatively, the client systems and servers are suitably interconnected through any combination of two or more data communications media. Although the communications links between client systems and server are preferably available at all times, some embodiments of the invention use polling or batch processing schemes whereby client systems and servers interact only at predetermined time periods. Alternatively, persons representing business entities provide information to database server 116 through any form of communication including telephone, Internet, mail or any other suitable means.

Figure 3:
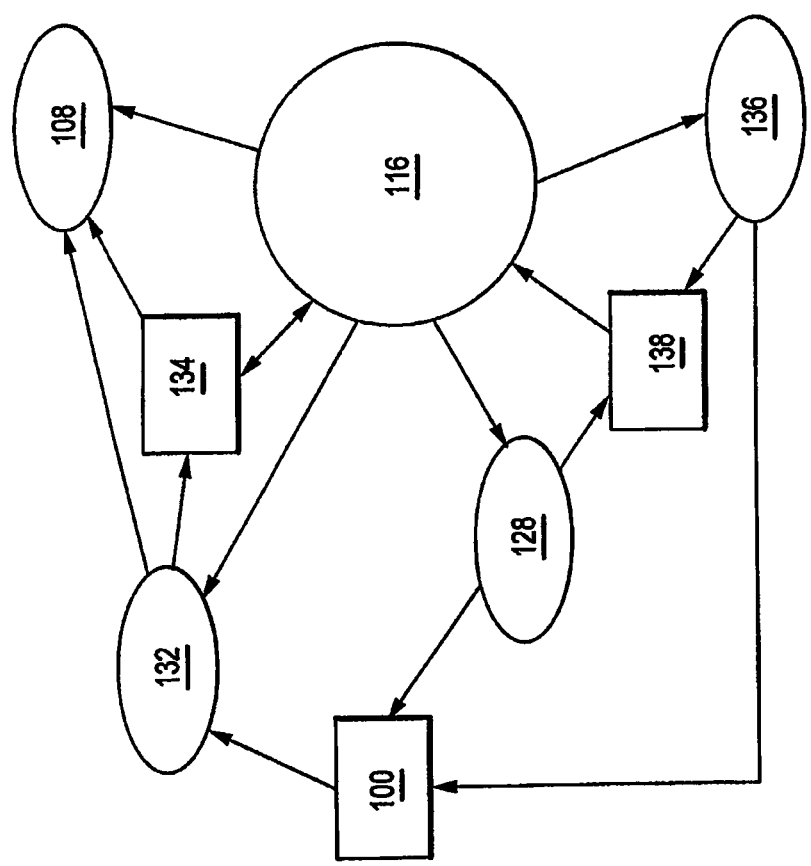
FIG. 3 is an entity relationship diagram showing exemplary data flows for creating and initializing a new stored value account.

As can be seen in the exemplary embodiment shown in FIG. 3, in use, a client system 138 preferably notifies database server 116 of a consumer 100 request for a new card. In other embodiments of the invention, client system 138 is bypassed and a new card request from a consumer 100 is provided to database server 116 electronically, or through a customer service representative, or through another means. After processing the new card request as discussed below, database server 116 preferably sends a message to card production system 128 which suitably creates a new card by known card creation methods and the new card is forwarded to consumer 100. Card production system 128 also suitably notifies the relevant client system 138 (if applicable) that a card has been created.

After the card is created and sent to consumer 100, in preferred embodiments of the invention, consumer 100 activates the card prior to use. Activation is preferably accomplished through an activation server 132 that receives information about new cards from database server 116, preferably either in real time as cards are created, or alternatively, activation server 132 receives information in batches at predetermined periods of time. Various activation servers are known in the prior art and activation server 132 may be implemented internal or external to the present invention. To activate the card, consumer 100 suitably contacts activation server 132 via telephone, Internet or another connection to verify the consumer's identity. Consumer is verified through any suitable verification method, including recitation of a number printed on the card (or mailed with the card) or recitation of some identifying information about consumer 100 such as the consumer's social security number or parent's name. If the identity of consumer 100 is properly verified, then activation server 132 suitably notifies a transaction authorization system 108 that the card is approved for use. Various transaction authorization systems are known in the prior art and transaction authorization system 108 may be implemented internal or external to the present invention.

If the card is rejected, consumer 100 is preferably connected by telephone, Internet or other means to a customer service representative (CSR) 134 who verifies (preferably through online access to either client system 138 or database server 116) the consumer's ability to use the stored value card or account. If the account is rejected by CSR 134, then the card or account will remain blocked and transaction authorization system 108 rejects any use of the card or account. If the CSR is able to verify consumer 100 and the card/account, then CSR 134 preferably sends a "remove block" or comparable message to transaction authorization system 108 so that consumer 100 may properly use the verified and activated account.

If consumer 100 wishes to add value to the previously created card/account, the consumer generally provides the added funds to a client system 138 (via any communication means such as telephone, Internet, POS terminal, ATM machine, or the like) which in turn suitably passes the information to database server 116, causing database server 116 to update the consumer's account. In alternative embodiments, consumer 100 provides value directly to database server 116 in the form of a check or credit card number that may be electronically entered, or manually entered by a CSR. Alternatively, consumer 100 adds value to a card/account via, for example, a point of sale terminal, ATM machine, Internet connection or telephone connection. Funds are preferably recorded in database server 116 through a real-time or batch processing scheme.

Figure 2B:
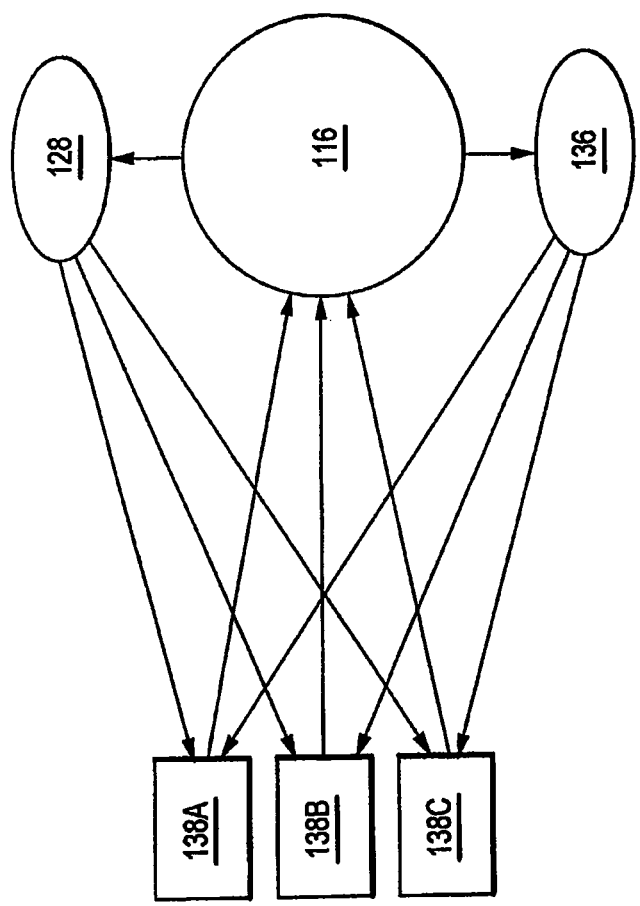
FIG. 2B is an entity relationship diagram of a second exemplary embodiment of the present invention.

FIG. 2A shows an exemplary direct bi-directional flow of information between client system 138 and database server 116. In contrast, the exemplary embodiments shown in FIGS. 2B and 3 show database server 116 receiving information directly from client systems 138A-C while providing data to client systems 138A-C through intermediating systems such as card production system 128 and report generating system 136. For example, database server 116 provides information to client system 138 preferably by sending a "generate report" or similar message with all necessary parameters of the data to report generating system 136 as shown in FIG. 3. Alternatively, database server 116 provides the report directly to client system 138 through a telephone, Internet, or other connection.

Transaction processing is preferably managed through interaction between database server 116, transaction authorization system 108, and a transaction capture module 112. As can be seen from FIG. 4, database server 116 suitably communicates card/account status information to transaction authorization system 108. Status information generally includes account balance updates, status changes or the like for the various card accounts. For example, new cards are preferably assigned a "hold" status in transaction authorization system 108 until consumer 100 initializes and validates the card as described above, at which time the authorization system preferably changes the status from "hold" to "pass" (or similar terms). A "hold" status is also preferably assigned if an account balance decreases below a minimum amount, or if a card is lost or stolen or the like. Accounts/cards that are assigned a "hold" status are preferably rejected by transaction authorization system 108 in any subsequent requests for transaction approval.

Point of sale terminal 104 is any device that is capable of identifying and gathering data from any stored value product. For example, point of sale terminal 104 could be implemented as an actual terminal in a store, an Internet server, a telephone system, a card reader in a vending machine, an automatic teller machine, or any other device that is capable of accepting stored value information in financial transactions. Point of sale terminal 104 suitably communicates with transaction authorization system 108 to approve or reject transactions based upon information available to the transaction authorization system 108 from database server 116. Alternatively, transaction authorization system 108 supplements information from database server 116 with information obtained from other external sources (not shown) such as external authorization systems, credit reporting bureaus, etc. Authorization preferably takes place in real time, but in some embodiments the authorization is accomplished using a polling or batch processing scheme. In a preferred embodiment, when a consumer 100 presents a stored value card or enters an account at a point of sale terminal 104, the terminal sends an authorization request for the transaction to transaction authorization system 108. Additionally, for some transactions (such as those involving very small amounts of money) point of sale terminal 104 may not transmit an authorization request at all. Although authorization may take place over any communications medium, authorization preferably occurs over a data communications link such as a telephone link, a leased line, the Internet, a wide area network, or the like.

If the transaction is authorized, the transaction is preferably completed at point of sale terminal 104. Point of sale terminal 104 generally requests information such as the transaction amount and the identity of the stored value product used to pay for the transaction and this information is then suitably transmitted to transaction capture module 112 for settlement. To facilitate batch processing of settlement requests, merchants generally store information for multiple transactions. Alternatively, settlement requests are suitably transmitted in real time or are suitably polled by transaction capture module 112.

Figure 4:
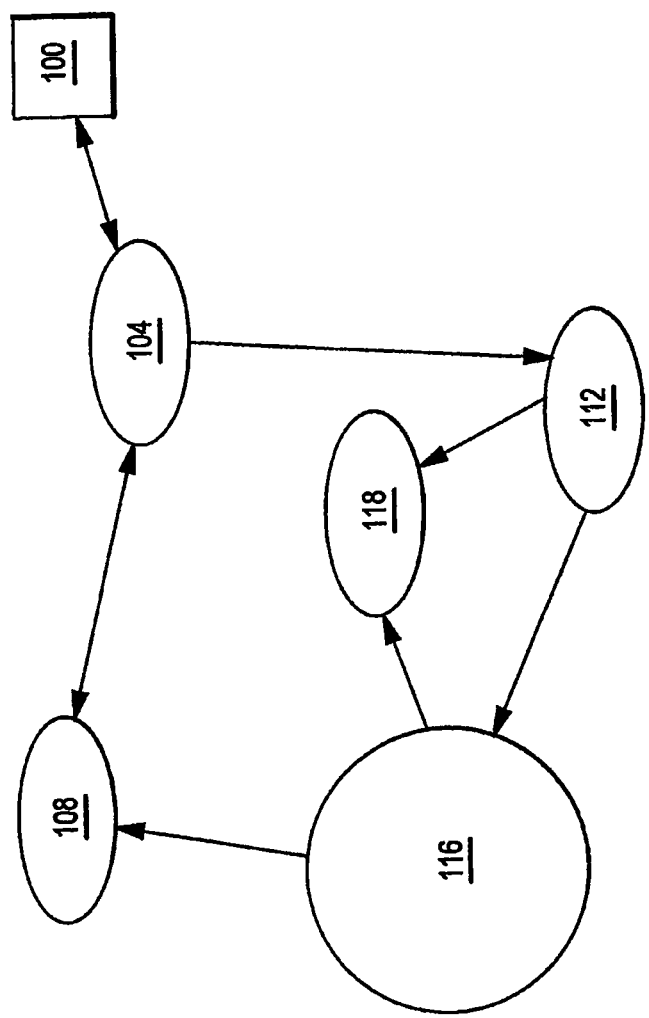
FIG. 4 is an entity relationship diagram showing exemplary data flows for transaction processing.

With continued reference to FIG. 4, transaction capture module 112 suitably captures financial transaction data from POS terminal 104 and routes this information to database server 116. During a purchase transaction involving a stored value product, funds are suitably transferred from an account associated with a stored value card into a merchant's account. Records for card and merchant accounts are generally accessible by database server 116, and are preferably maintained within database 142 (not shown in FIG. 4). A balancing system 118 is preferably located between database server 116 and transaction capture module 112 to verify transaction data. Balancing system 118 is any computer system that provides a check based upon data received from database server 116 and transaction capture module 112.

Figure 5:
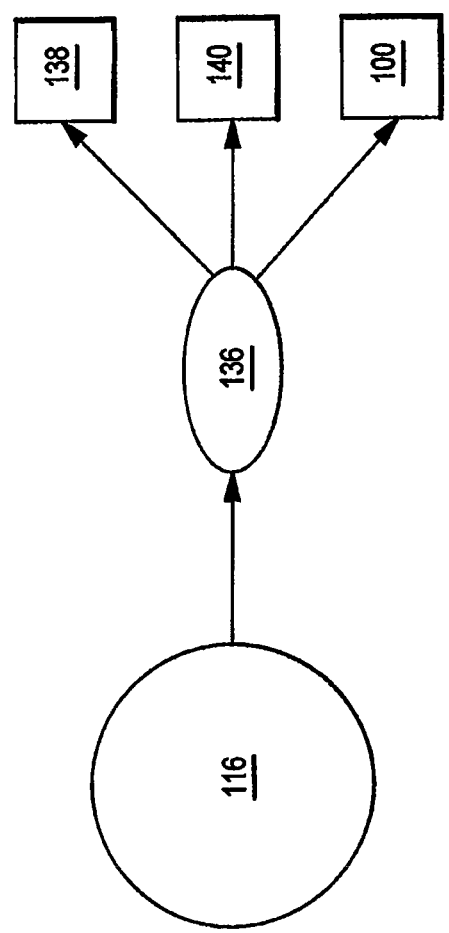
FIG. 5 is an entity relationship diagram showing exemplary data flows for report generation.

As best shown in FIG. 5, a single report generating system 136 preferably generates reports (1) for client system 138 using stored value products, as described above; (2) for merchants 140 that accept stored value products as compensation for goods or services; or (3) for consumers 100 that receive, for example, periodic statements of their accounts and transactions. Alternatively, multiple report generating systems 136 create various reports. As another alternative, database server 116 internally generates some or all reports without the use of an external report generating system 136. In some embodiments of the invention, reports are generated in real-time (i.e. as requested by the account manager, the consumer, the database server 116, or any another entity). Alternatively, reports are processed in varying embodiments in batches, at predetermined times, when polled by the report generator, or by any other timing arrangement. Report generating system 136 preferably retrieves relevant data from a database associated with database server 116. In other embodiments, database server 116 provides necessary data to report generating system 136 as part of a report generation request. Alternatively, database server 116 suitably sends a pointer (such as a memory address accessible via a shared bus, or a uniform resource locator (URL), or any other pointer) to information that is stored. After obtaining data for the report requested, report generating system 136 formats the data and provides the data to the proper client system 138. Various report generating systems are known in the prior art, and any report formatting system may be used in accord with the present invention.

Figure 6:
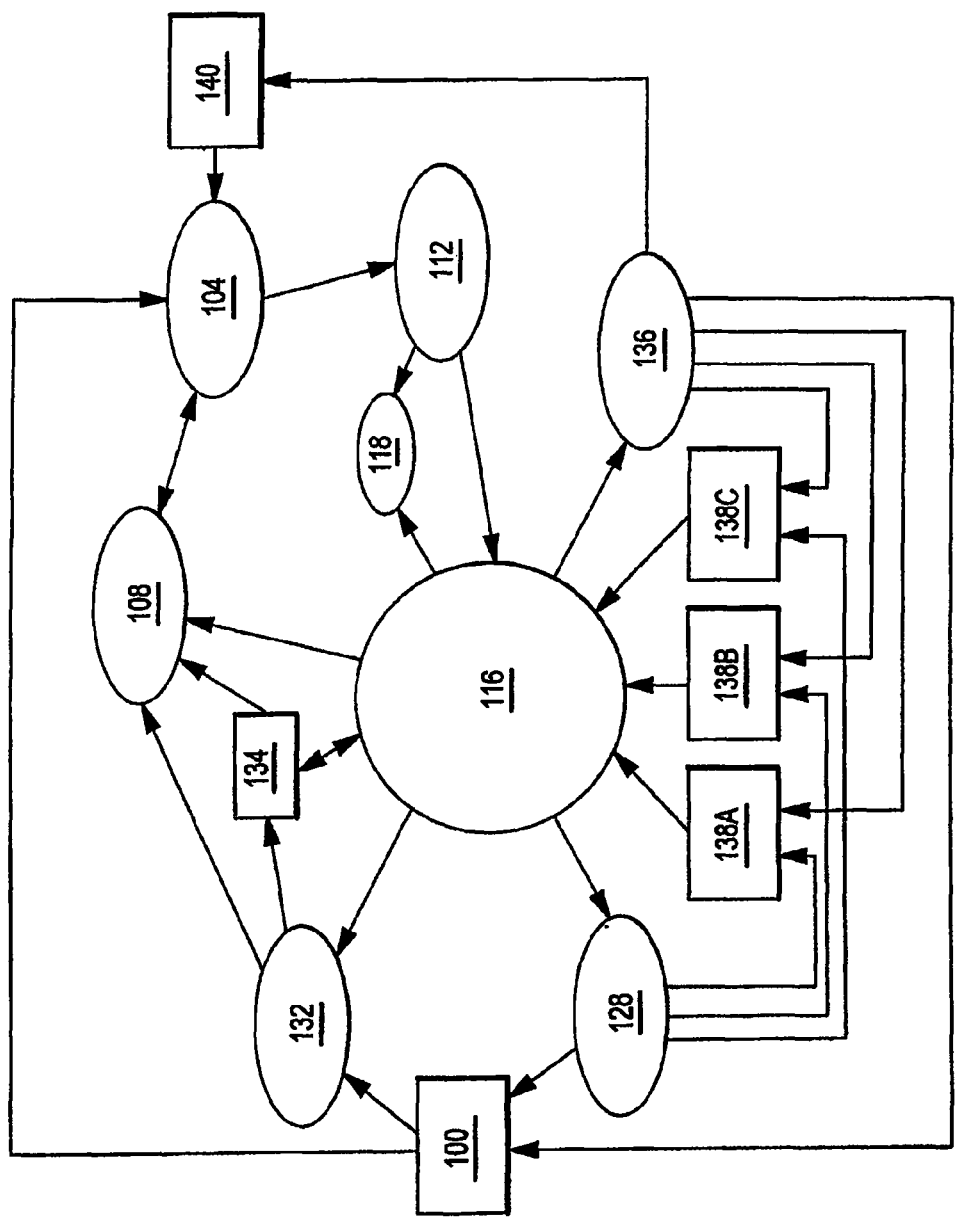
FIG. 6 is an entity relationship diagram of an exemplary embodiment of a database server based transaction system.

FIG. 6 shows an exemplary embodiment of a combined system for adding cards, handling transactions and processing reports. As can be readily ascertained from FIG. 6, a preferred embodiment of a stored value transaction system includes a database server 116 supporting multiple stored value products, each product preferably being associated with a particular client system 138. Database server 116 preferably receives input from client system 138 and from a transaction capture module 112, as well as optional online input from consumers or customer service representatives 134. Stored value cards and accounts are preferably registered with a transaction authorization system 108 that is configured to approve or deny individual transactions at various point of sale terminals such as terminal 104 in the drawing figures. Preferably, database server 116 communicates with a report generating system 136 that is configured to assemble data into reports for client systems 138, merchants 140 and/or consumers 100, thereby formatting and simplifying data output from database server 116.

Figure 7:
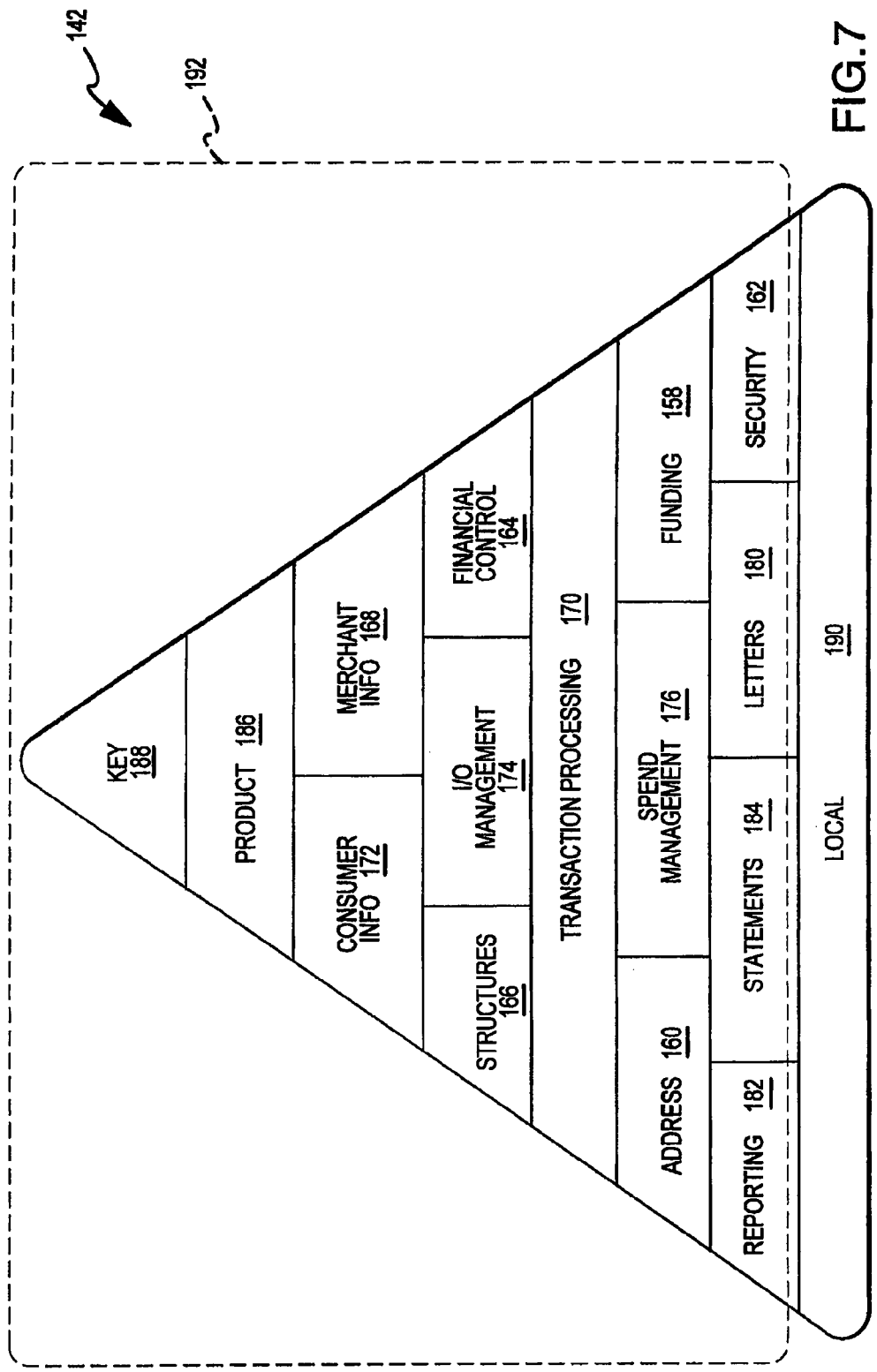
FIG. 7 is a functionality pyramid showing an exemplary arrangement for a database server.

As stated above, database server 116 includes common data and operations for the various stored value products. Database server 116 preferably retains at least core information 192 and local information 190, as shown in FIG. 7. Core information 192 generally includes all functions, data, software and infrastructure that are common to all stored data products, including database management, interface formatting, transaction management and various product features. Local information 190, is generally non-standard information that is specific to a particular product, country or consumer that provides no shared value for other applications. Local information 190 includes, for example, language details, local currency, taxes, customs, address formats, and local interface data. Separating local information 190 from core information 192 allows flexibility to implement coding "shortcuts" that may provide the most effective solution to certain individual tasks. Shortcuts are possible because some local information 190 is not applicable to core information 192. Moreover, local information 190 is located at the-bottom of the database organizational pyramid shown in FIG. 7, indicating that local data does not substantially update or modify core information 192. Core information 192, however, frequently modifies local information 190. Thus, separating high value business rules and objects (i.e. core information 192) from low-level technical infrastructure (i.e. local information 190) promotes implementation independence, and hence greatly facilitates the sharing of data and resources between disjoint stored value products.

Database server 116 generally retains information substantially within a database 142 that is preferably a relational or object oriented database. In a particularly preferred embodiment, database server 116 is an AS/400 computer running DB/2 database server software available from the IBM Corporation of Armonk, N.Y. In other exemplary embodiments, database 142 is implemented using SQL Server (available from the Microsoft Corporation of Redmond, Wash.), ORACLE Database Server (available from the Oracle Corporation of Redwood Shores, Calif.) or ADAPTIVE Server (available from the Sybase Corporation of Emeryville, Calif.) miming on any form of computer hardware.

In a preferred embodiment, database 142 is separated into various logical subsystems generally identifying particular classes of objects. Classes of objects generally include, inter alia, functions and attributes. "Functions" correspond to operations performed by objects of the particular class. "Attributes" correspond to characteristics that objects of the class exhibit. For example, a "smartcard" class generally contains functions for creating new cards and adding value to existing cards, as well as attributes that identify cardholders and accounts. Subsystem classes as shown in FIG. 7, then, generally contain objects that perform related functions and/or retain related information.

Database 142 preferably contains a "key" field that partitions the database according to a high-level class of objects. An example of a "key" field is the "business unit" key class 188 shown in FIG. 7. In the exemplary embodiment shown in FIG. 7, the "business unit" key class 188 organizes the database into partitions corresponding to, for example, a company organizational structure. Alternate embodiments of the invention organize database 142 in radically different fashions by using differing key fields. For example, the key could be used to logically separate database 142 according to geographic region (e.g. "North America", "Europe" and "Asia"), or according to product classes (e.g. "Smartcard", "ATM card", "Internet account" and the like), or according to any other suitable differentiator. Key class 188 substantially defines many of the default values for various dependent classes because objects depending from key object class generally inherit substantially all of the attributes and functions defined for the parent class. In an embodiment that uses "business unit" as a key class 188, for example, all database objects that reside in the same business unit generally share common default currencies, languages, product details, address masks and the like.

Regardless of the particular key class 188 selected, in preferred embodiments the key class 188 logically separates objects maintained on database 142. Objects belonging to different key classes 188 are preferably separated by hardware or software "firewalls" that partition database 142 based upon the key. A firewall is any mechanism that prevents access across a logical boundary. Although the firewalls are preferably implemented as software access controls, alternate embodiments include user ID/password schemes or hardware controls such as router-implemented access restrictions. Alternatively, multiple firewall techniques such as physical access controls and software controls are combined. Firewalls generally preserve business unit autonomy and data integrity by isolating data according to, for example, the key field.

In a preferred embodiment, secondary classes 186 depending from key class 188 are created to substantially define individual stored value products. Each of these secondary classes 186 generally depends from the key class 188. Alternatively, intermediate classes (corresponding to geographic region, business sub-units, or any other suitable form of differentiator) exist between the highest level key class 188 and the secondary class 186. In the exemplary embodiment shown in FIG. 7, secondary class 186 differentiates various products belonging to the same key class 188. Objects belonging to the secondary class 186 inherit attributes and functions from the applicable parent "business unit" key class 188.

Figure 8:
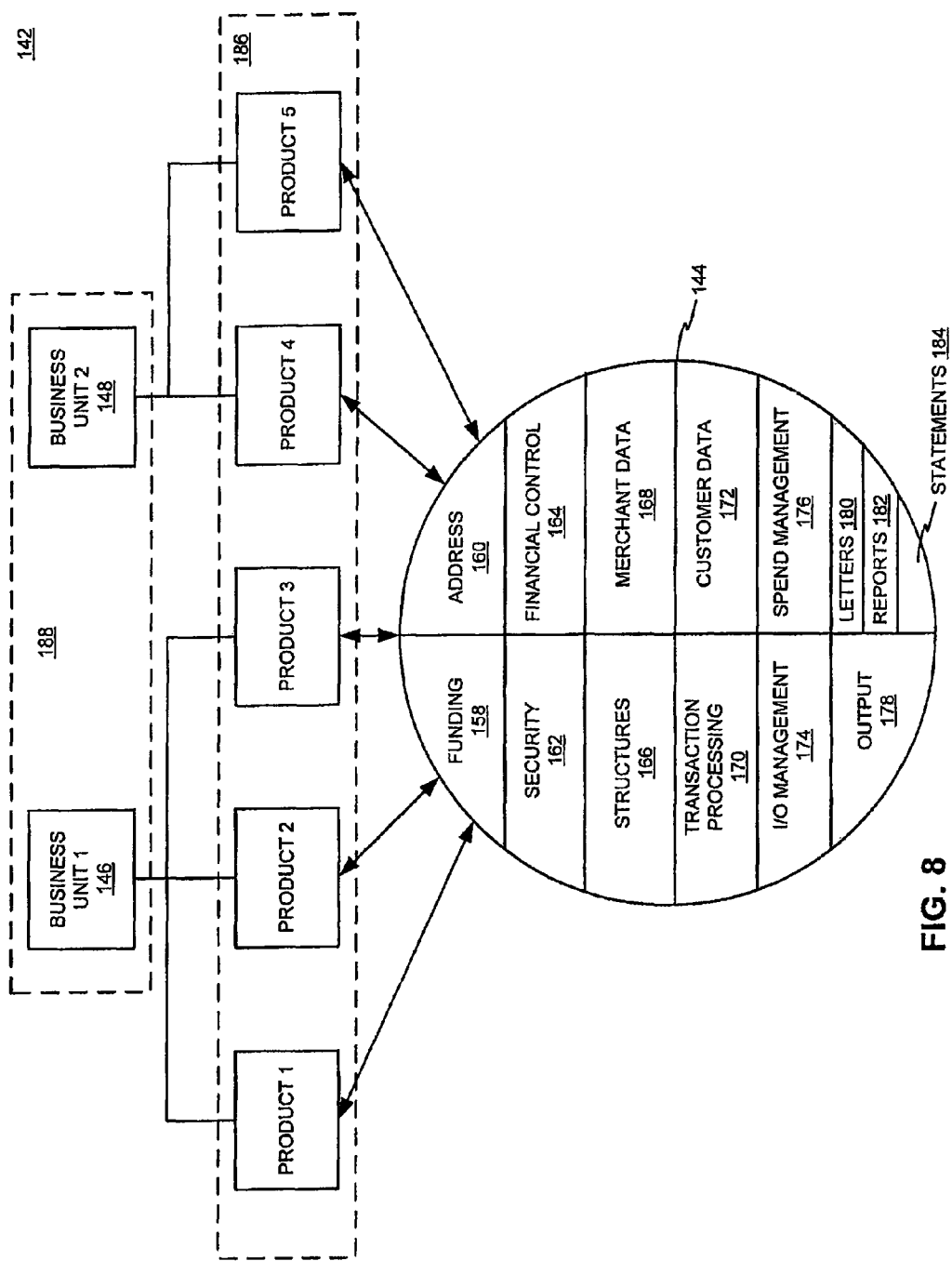
FIG. 8 is an entity relationship diagram showing data flows for an exemplary implementation of the database authorization.

The exemplary embodiment shown in FIG. 8 includes a "business unit" key class 188 that separates database 142 into Business Unit One (BU1) 146 and Business Unit Two (BU2) 148. Objects BU1 146 and BU2 148 in FIG. 8 are instances of the key "business unit" key class 188, and objects 150, 152, 154, 156, and 157 are instances of secondary class 186. In the example shown in FIG. 8, objects 150, 152, and 154 depend from object BU1 146, and objects 156 and 157 depend from object BU2 148. Each of the objects 150, 152, 154, 156, and 157 represents a separate stored value product such as a particular smartcard program, ATM card program, or the like. For example, both object 150 and object 156 could define smartcard products, even though these two objects depend from different business units. Although the two "smartcard" classes are distinct from each other and each preferably contains independent local data, functions and attributes, the two object classes preferably share functions and attributes as described below.

With continued reference to FIG. 8, database 142 preferably includes an object repository 144 that generally functions as a library of objects. Objects retained within repository 144 suitably perform various functions or retain particular formats of data, as described below. These objects are suitably utilized by objects of key class 188 and secondary class 186, as well as any intermediating classes (not shown). Objects contained in repository 144 generally provide core functionality required by the various product objects of secondary class 186. Because each product object of secondary class 186 has access to the entire repository 144 of core information, objects stored in repository 144 are effectively shared and re-used by the various objects of key class 188 and objects of secondary class 186, thus resulting in substantially reduced programming effort and implementation time. Moreover, many objects contained within repository 144 suitably utilize other objects in the repository.

Different embodiments organize the various classes depending from the key class 188 in a variety of ways. Although repository 144 is shown in FIG. 8 as distinct from objects belonging to key class 188 and secondary class 186, this distinction is a logical distinction made for purposes of explanation only. One skilled in the art would understand that any organization of database 142 would fall within the scope of the present invention. For example, database 142 could be organized hierarchically, sequentially or in any another suitable manner. Objects in database 142 are preferably organized in a manner that provides optimum performance while efficiently using hardware resources such as storage space and memory on database server 116.

Repository 144 generally includes various groupings of objects (called "subsystems") that have similar attributes or that perform similar functions. Although particular subsystems are described herein and in the accompanying drawings, one skilled in the art would appreciate that various object groupings could be formulated that are within the scope of the invention. For example, any of the groupings presented herein could be eliminated, or additional groupings could be added. Moreover, the various objects could be arranged in any of a variety of subsystems. The various subsystems of an exemplary preferred embodiment of repository 144 are discussed below.

With continued reference to FIG. 8, the various subsystems within repository 144 will now be described. Funding subsystem 158 within repository 144 generally includes objects that add value to stored value cards. Funding features are generally selected according to relevant product classes so that funds from many sources may be applied to many different stored value products without requiring individualized programming for each product. For example, an "ATM account transfer" object defines a process for transferring money from a consumer's checking account to a stored value card in response to the consumer's input at an ATM. Once defined, this object is preferably used by multiple product objects such that the same software code facilitates ATM transfers to smartcards, phone cards, and other stored value products. The funding subsystem preferably includes such features as funding delays, input of batch funds, applying funding fees, applying funds at a card or an account level, or handling suspended/held funds.

Customer records are preferably maintained in a customer data subsystem 172 that generally implements a single database record for each customer even though the customer may use multiple stored value products. Card data, account data, client data customer data and the like all generally reside within customer data subsystem 172, which frequently communicates with objects from the products, funding, transaction processing and address subsystems described herein. Additionally, many user interface elements such as screens and access control are generally contained within the client demographics subsystem.

Objects associated with merchant data subsystem 168 generally enable specific merchant processing options. Other objects preferably store contract information relative to specific merchant product offerings, such as special offers or joint marketing efforts such as rebates, loyalty awards, etc. Merchant data subsystem also preferably includes accounts payable objects that enable merchants to capture stored value transactions for settlement.

Addresses (including, for example, customer billing addresses, merchant addresses and the like) are preferably maintained in address subsystem 160. Address subsystem 160 generally houses address information and provides an interface with all other subsystems needing address information, such as the customer data subsystem 172 and merchant data subsystem 168. Address subsystem 160 suitably provides a single point for maintaining substantially all of the address information stored in database 142, and preferably supports multiple addresses for each person (e.g. home, business and Internet addresses, among others). Other objects in address subsystem 160 preferably support temporary addresses, optionally with an associated "effective date" such that forwarding addresses, traveling addresses, and the like are supported.

Transaction processing subsystem 170 generally includes objects for storing and managing financial and non-financial transactions. Preferably, many objects associated with transaction processing subsystem 170 contain mechanisms to provide substantially real time access to financial data by, for example, customer service representative 134 as described above for online transaction inquiries. Preferably, transaction processing subsystem 170 is also accessible by at least customers and merchants. Transactions are generally formatted by type (e.g. airline, car rental, retail purchase, and the like) such that transaction records are easily searchable.

Preferably, repository 144 includes a spend management subsystem 176 that includes objects that implement various product-specific spend management rules. For example, spend management rules may allow certain cards to only be used at specified merchants within a particular geographic region, or within a specific time period. Alternatively, spend management subsystem 176 may also provide available balance information to consumers or to external transaction authorization system 108. Preferably, spend management subsystem includes objects that are configured to track spending patterns of cardholders/consumers to assist in determining product effectiveness.

Repository 144 preferably includes an input/output (I/O) management subsystem 174 that includes objects for funneling interface data in and out of database server 116. Preferably, I/O management subsystem 174 includes objects that track, manage and log data sent and received by database system 116. In a preferred embodiment, I/O management subsystem 174 contains mechanisms for real-time access to database information that are utilized by, for example, CSRs and customers needing access to data retained transaction processing subsystem 170.

Financial control subsystem 164 generally includes objects that are configured to substantially protect the financial integrity of database system 116. Generally, financial control system 164 receives data from transaction capture module 112, as well as funding subsystem 158 to maintain accurate account balance information. Financial control system 164 optionally includes objects that implement an interface to disputes and adjustments subsystems (not shown).

Data sharing between various objects and classes is preferably facilitated by a structures subsystem 166 that suitably combines groups of cards, accounts or merchants into common classes. The structures subsystem 166 establishes and maintains hierarchical relationships established by customers, corporations, governments and the like by defining data structures corresponding to these relationships. These data structures are suitably utilized to group members of a particular hierarchy together across various stored value products. In a preferred embodiment, structures subsystem 166 suitably allows viewing and reporting of such classes according to predefined hierarchies. Defining various relationships into structures presents several advantages over treating entities within the hierarchy individually. First, the data structures facilitate easy movement, copying and transferring of information from one entity to another because only the data structure (and not each individual member) need by moved. Secondly, structures may be suitably modified as a class, thereby reducing the need for changes to individual objects corresponding to members of the class. For example, if a data structure represents individuals belonging to a hierarchy (such as a corporate reporting structure) and the name of the hierarchy changes, the change need only be entered once (in the data structure object) and not in every object corresponding to every member of the hierarchy.

Database server 116 preferably includes a security subsystem 162 that includes objects for managing security controls throughout the database. Users generally are assigned one of various levels of authority based upon the user's need to obtain information. Security restrictions are preferably implemented at many levels in the database 142, including at the key class 188 level and the secondary class 186 level. Objects in security subsystem 162 generally implement the firewalls discussed above.

Objects from output generation subsystem 178 generally provide formatting and control of data output from database 142. In a preferred embodiment, outputs are administered by three separate optional subsystems corresponding to letters module 180, reports module 182 and statement module 184. In other embodiments, a single output generation subsystem 178 provides all outputs. Letters module 180 preferably contains objects for generating and producing letters such as, for example, automated letters, event driven letters (e.g. negative balance, collections, etc.), CSR initiated letters (service, dispute resolution, etc.) and legal notifications (change in terms, legal disclosures, etc.). The reporting module preferably includes objects for scheduling, creating, and maintaining all database reports. In a preferred embodiment, objects included in report module 182 interfaces with external report generating system 136 for actual report creation. Alternatively, objects included in report module 182 substantially prepare and format reports, thereby incorporating the functionality of external report generating system 136. Objects associated with the statements module 184 preferably create or format database statements such as periodic bills. Objects included in output generation subsystem 178, 180, 182 and 184 preferably produce output via selectable media such as fax, paper, Internet or any other information transmission media.

Figure 9:
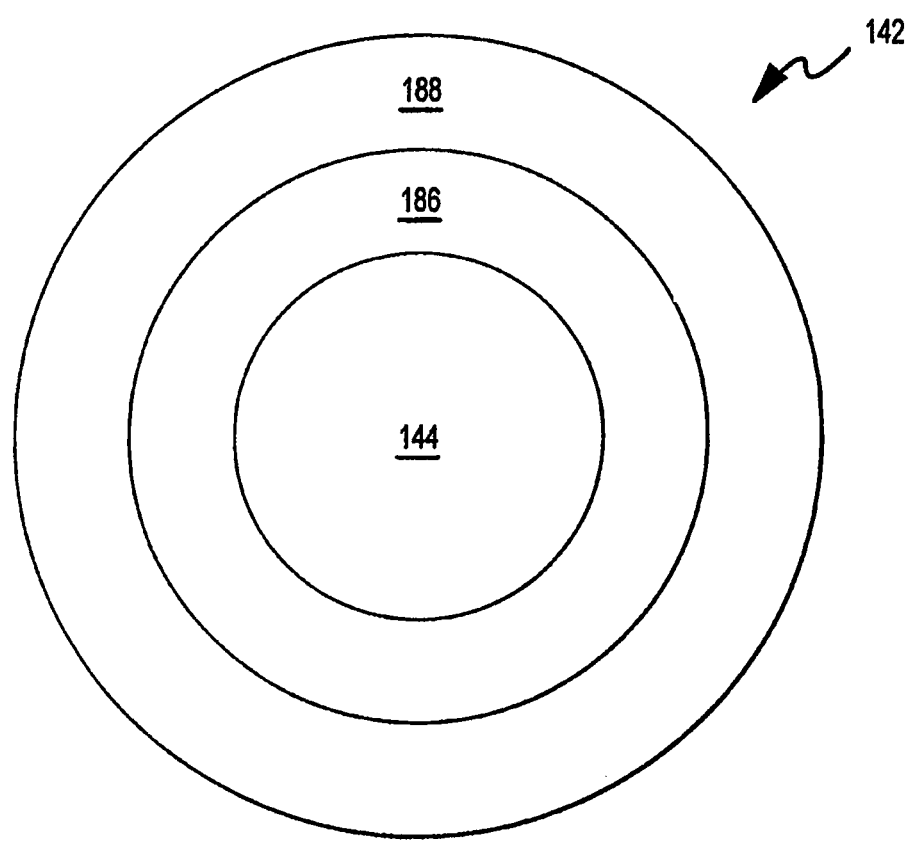
FIG. 9 is an entity relationship diagram showing an exemplary relationship between various objects in the database.

Referring now to FIG. 9, stored value products of secondary class 186 are created using various objects from repository 144. Generally speaking, users create new products in accordance with a particular business unit key class 188 by selecting suitable objects from repository 144 that correspond to those attributes and functionalities desired in the new product of secondary class 186. For example, a user may select, among others, an object for creating a card, various objects for storing value in an account associated with the card (or on the card itself), an object to manage financial transactions, and an object to generate reports for consumers. When these objects are selected, database server suitably assembles a product structure that references the various objects requested. In a preferred embodiment, product structures are tables of pointers to the various objects in repository 144, but any suitable method of organizing the various objects (such as in a data structure or in a database record) could be used. When the product executes, database server 116 retrieves the particular objects requested. Because this method of constructing products substantially reuses objects of pre-written code, design and implementation times are significantly reduced.

The corresponding structures, materials, acts and equivalents of all elements in the claims below are intended to include any structure, material or acts for performing the functions in combination with other claimed elements as specifically claimed. The scope of the invention should be determined by the appended claims and their legal equivalents, rather than by the examples given above.

The invention claimed is:
1. A computer-based system, comprising:
memory having program instructions stored therein, wherein the program instructions are executable by the computer-based system to cause the computer-based system to perform operations including:

managing a database on behalf of a plurality of different clients that are issuers of stored value products, wherein stored value products included in the database are assigned a respective prepaid account balance available for transactions, and wherein managing the database includes storing account balances for a plurality of the stored value products, wherein the database includes a record for a consumer to which at least two of the plurality of stored value products have been issued; and facilitating a transaction using one of the at least two stored value products, wherein facilitating the transaction includes adjusting a stored account balance for the stored value product.

2. The computer-based system of claim 1, wherein the operations further include:

receiving a notification from a client specifying that a consumer has requested creation of a card associated with an account of one of the plurality of stored value products; and in response to receiving the notification, contacting a card production system configured to create the card, wherein the database includes information about the card.

3. The computer-based system of claim 2, wherein the operations further include:

providing information about the card to an activation server configured to perform activation of the card for the consumer.

4. The computer-based system of claim 1, wherein the operations further include:

receiving a notification from a client specifying that a consumer has provided funds to the client;

in response to receiving the notification, adjusting an account balance associated with one of the plurality of stored value products.

5. The computer-based system of claim 1, wherein the operations further include:

storing, in the database, one or more management rules associated with one of the plurality of stored value products, wherein the one or more management rules include a rule specifying that usage of the stored value product is permitted within only a specified time period.

6. The computer-based system of claim 1, wherein the operations further include:

provide information from the database to a report generating system configured to generate a periodic account statement for the consumer.

7. The computer-based system of claim 1, wherein the clients represent different brands of stored value products.

8. The computer-based system of claim 1, wherein one of the plurality of stored value products corresponds to a prepaid phone card.

9. A computer-based system, comprising:

memory having program instructions stored therein, wherein the program instructions are executable by the computer-based system to cause the computer-based system to perform operations including:

receiving requests from a plurality of clients, wherein each client is an issuer of one or more respective stored value products, wherein stored value products are assigned a respective prepaid account balance available for transactions, and wherein the requests includes requests to store transaction information usable to facilitate transactions with the stored value products, wherein the transaction information includes account balances of the stored value products; and storing the transaction information in a database of the computer-based system.

10. The computer-based system of claim 9, wherein the transaction information includes consumer records for consumers to which ones of the stored value products have been issued, and wherein the transaction information includes at least one record for a consumer to which at least two of the stored value products have been issued.

11. The computer-based system of claim 9, wherein the stored value products include magnetic-stripe cards, smart-cards, ATM cards, RFID cards, or Internet transaction account cards.

12. The computer-based system of claim 9, wherein the operations further include:

receiving a request from one of the plurality of clients to add value to a stored value product; and in response to the request, adjusting an account balance associated with the stored value product.

13. The computer-based system of claim 9, wherein the operations further include:

providing stored transaction information from the database to a transaction authorization system, wherein the transaction authorization system is configured to facilitate a transaction conducted using one of the stored value products.

14. The computer-based system of claim 9, wherein the provided transaction information includes a card status indication specifying whether transactions are permitted with a stored value product.

15. The computer-based system of claim 9, wherein the operations further include:

organizing the database according to one or more product classes associated with the stored value products.

16. The computer-based system of claim 9, wherein the operations further include:

organizing the database according to one or more geographic regions associated with the stored value products.

17. A method, comprising:

a client system of a stored-value-product issuer providing, to a computer-based system, account information associated with stored value products issued by the issuer, wherein the computer-based system is configured to maintain a database of account information associated with a plurality of stored-value-product issuers, and wherein the computer-based system is configured to communicate with a transaction authorization system to facilitate transactions with one or more of the stored value products, wherein the one or more stored value products are assigned a respective prepaid balance available for transactions, wherein the account information includes account balances for the one or more stored value products; and the client system receiving account information from the computer-based system, wherein the received account information includes information from the database.

18. The method of claim 17, further comprising:

the client system providing a notification to the computer-based system, wherein the notification specifies that value be added to an account associated with a stored value product offered by the issuer, and wherein the computer-based system is configured to adjust an account balance of the account based on the notification.

19. The method of claim 17, further comprising:
the client system providing a notification to the computer-based system, wherein the notification specifies that a consumer has requested creation of a stored value product, and wherein the computer-based system is configured to contact a production system to create the stored value product.

20. The method of claim 17, wherein the received account information includes a report generated by the computer-based system, wherein the report is associated with one or more of the plurality of stored value products.

* * * * *